United States Patent [19]

Park

[11] Patent Number: 4,942,601

[45] Date of Patent: Jul. 17, 1990

[54] METHOD OF MAKING A CALL RESERVATION AND SENDING AN INTERRUPT TONE IN A PRIVATE BRANCH EXCHANGE (PBX)

[75] Inventor: Jae-Woon Park, Anyang, Rep. of Korea

[73] Assignee: Samsung Electronics Co., Ltd., Kyung Ki-Do, Rep. of Korea

[21] Appl. No.: 373,569

[22] Filed: Jun. 30, 1989

[30] Foreign Application Priority Data

Jun. 30, 1988 [KR] Rep. of Korea .................. 1988-8028

[51] Int. Cl.⁵ ............................................ H04M 3/48
[52] U.S. Cl. .................................... 379/209; 379/208; 379/215
[58] Field of Search ................ 379/201, 209, 215, 208

[56] References Cited

U.S. PATENT DOCUMENTS

| | | | |
|---|---|---|---|
| 3,944,750 | 3/1976 | Subanski | 379/208 X |
| 4,096,358 | 6/1978 | Bidlack et al. | 379/208 X |
| 4,759,055 | 7/1988 | Okumura et al. | 379/209 X |

Primary Examiner—James L. Dwyer
Attorney, Agent, or Firm—Robert E. Bushnell

[57] ABSTRACT

Disclosed is a method that gives a priority service to enable a subscriber with an urgent message to call another subscriber who is already engaged in a telephone conversation, regardless of the reservation order, and sends an interrupt tone regularly to the target subscriber as a notification that he has a priority reservation and the subscriber engaged in the telephone conversation can link himself with the priority subscriber without having to cut off the current telephone conversation. The method comprises a plurality of control sequences performed in accordance with the attached flow chart figures.

1 Claim, 6 Drawing Sheets

METHOD OF MAKING A CALL RESERVATION AND SENDING AN INTERRUPT TONE IN A PRIVATE BRANCH EXCHANGE (PBX)

BACKGROUND OF THE INVENTION

The present invention relates to a method of making a reservation with a subscriber who is engaged in telephone conversation in private branch exchange (PBX) or keyphone system, and more particularly a method that provides a periodic interruption to the subscriber and another subscriber who has a reservation with the highest priority and allows the subscriber to be linked with said another subscriber with the reservation without terminating the telephone conversation with the other subscriber who is currently engaged in the telephone conversation.

Figure 1:
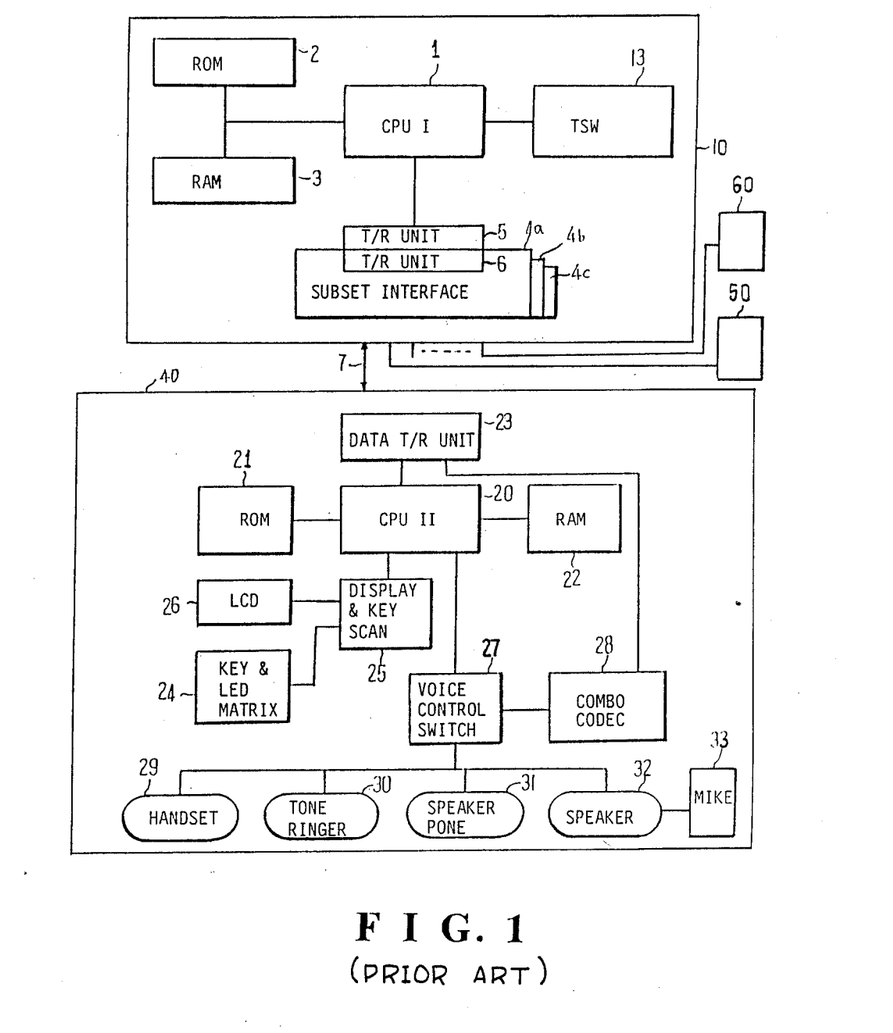
FIG. 1 is a system block diagram performing the present invention.

In general, when there are several subscribers who have made reservations for a telephone conversation with a specified subscriber, they are served in the order of their reservations according to a known reservation method of a telephone conversation. FIG. 1 is an example of such a reservation system, which is a switching system comprised of a main system 10 and subsets 40, 50. The main system consisting of a known configuration, accesses ROM 2 and RAM 3 in Central Processing Unit (CPU I), controls time switch (TSW) 13, and transmits and receives various data with the key subset 40 through transmission and reception (T/R) units 5, 6 as well as subset interface circuits 4a, 4b, and 4c. Another Central Processing Unit(CPU II) 20 provided in the subset 40, accesses ROM 21 and RAM 22, uses data transmission and reception (T/R) unit for data communication with the main system, processes control and display data from the main system 10, and sends key data entered from subset key matrix 24 to the main system 10 through the data transmission and reception unit 23. The Central Processing Unit 20 in the subset allocates combo-codec's channel by controlling voice control switch 27 and, when the handset 29 is on-hook, turns ON speaker 32 and microphone 33 and connects the speaker, the microphone and a tone ring to tone ringer 30.

Figure 2:
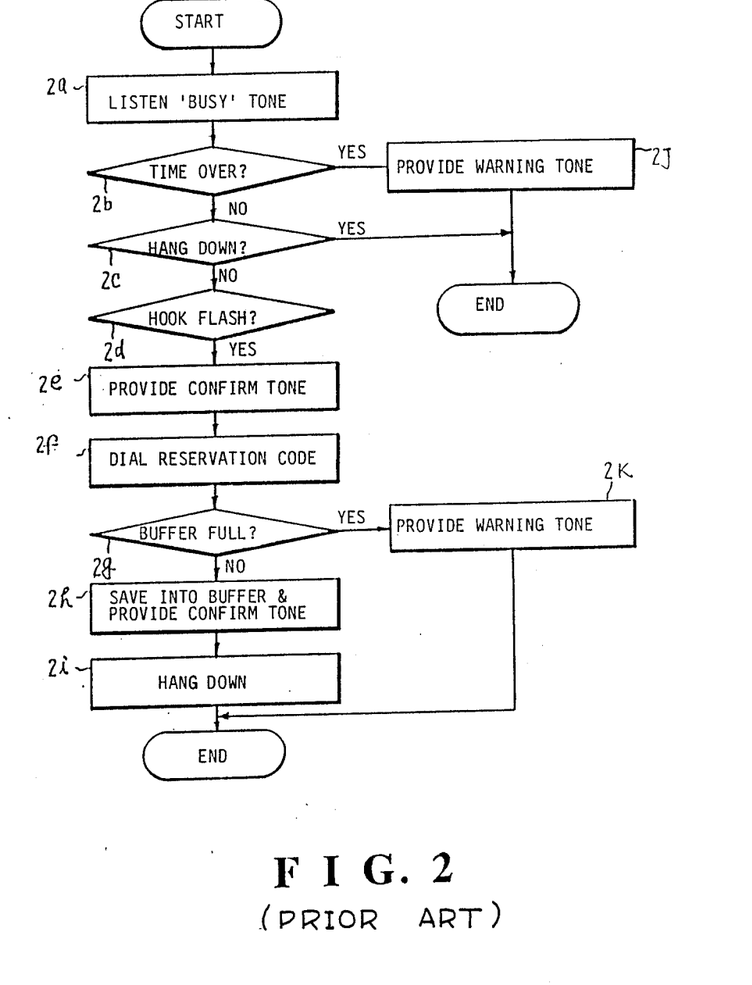
FIG. 2 is a flow chart of a conventional method.

FIG. 2 is a flow chart of a conventional method. Firstly, it will be described the conventional reservation method with reference to the circuit in FIG. 1 and the flow chart in FIG. 2. For the sake of convenience, the subsets 40, 50 and 60 in the FIG. 1 are each called first, second and third, subsets hereinafter. In the FIG. 1 if a first subscriber dials numbers for the second and third subsets through a keyboard of the key matrix and the LED matrix 24 when a second and a third subscribers are engaged in a telephone conversation through the second and third subsets, key entries are scanned periodically in the display and key scanning circuit 25 and then transmitted to the CPU II. When the CPU II sends this data to the CPU I through the data transmission/reception unit 23, the CPU I sends control signal to the CPU II asking it to send 'busy' tones through the handset 29 of the subset 40, in step 2a, and have the CPU II control the voice control switch 27 to send 'busy' tones through the handset 29 by the combo-codec 28. At that time, the CPU I sets transmission time length of the 'busy' tone in the ROM 2. The CPU I checks the transmission time length of the 'busy' tone in step 2b, and gives warning sounds through the speaker 32 in step 2j when the set time length is over, and cuts off the call. When the set time length is not over in said step, the CPU I checks if the handset of the subset 40 is on-hook in step 2c by checking the signals searched out from the CPU II.

When the handset 29 is on-hook in the step 2c, the CPU I checks, in the step cd, through CPU II, if a 'hook flash' function was performed in the subset 40. If the hook flash was not performed in the step 2d, the CPU I returns to said step 2a, but if performed, it gives a confirming sound through the handset of the subset 40 in the step 2c and dials a call reservation code through the key and LED matrix 24. And then, the CPU I performs a scanning operation in the display and key scanning circuit 25 and makes entered data be processed in CPU II and it checks if the reservation buffer of the RAM 3 is full or not, in the step 2g. When the reservation buffer is full, the CPU I gives a warning sound through the handset of the subset 40 and cuts off the call. But if the reservation buffer is not full, in step 2h, the CPU I saves said reserved number entered in the reservation buffer of RAM 3 and gives a confirming sound through the handset 29 of the subset 40. Thereafter, the reservation function is completed by hanging up the handset.

Therefore, the conventional method had such inconvenience that the time length of the 'busy' tone was always checked and, when it was over, the user had to hang up the handset. Thus, the user had to perform a hook flash sequence before the set time length of the 'busy' tone was over, dial a designated call reservation code, hear its confirming sound and wait with the handset on-hook until the other party hung up his handset. That is, in the prior art method, when subscribers make reservation with another subscriber who is engaged in a telephone conversation, the reservations will be served in the sequence that they are made. Thus, even if a caller had to talk urgently to the subscriber engaged in the telephone conversation with the other subscriber, he had to wait for his turn, and the engaged subscriber didn't have any way to know whether any reservations were made with him.

SUMMARY OF THE INVENTION

Therefore, the purpose of this invention is to provide a method that gives a priority service to enable a subscriber with an urgent message to call another subscriber who is already engaged in a telephone conversation, regardless of the reservation order, and sends an interrupt tone regularly to the target subscriber as a notification that he has a priority reservation and the subscriber engaged in the telephone conversation can link himself with the priority subscriber without having to cut off the current telephone conversation.

To achieve the above object and other advantages of the invention, the inventive method comprises the steps of:

(a) listening to 'busy' tone and sequentially deciding if or not 'hook flash' is performed, and thereafter if YES, steping a call reservation, or if NO, checking if or not the handset is on-hook and a specified time period set according to the 'busy' tone is over, when a dialing is made to the subset engaged in the telephone conversation;

(b) checking if or not there are any other subscribers who are waiting with auto-reservations, when the time-over of the busy tone has occured in the said step (a);

(c) saving information on the subscriber with auto-reservation in the call buffer of said subscriber engaged in the telephone conversation and asking a main system for the interrupt tones, when there is no waiting for auto-reservation in said step (b);

(d) switching from the 'busy' tone of reception unit to a music port to provide a music to the subscriber with the auto-reservation and asking the main system for a certain time length and checking the same, following said step (c);

(e) checking if or not said subscriber engaged in the telephone conversation has hung up his handset, when the time set in said step (d) is over, and if YES, operating the ringer to send a ring to the subscriber who has hung up the handset and disconnecting the music and providing a call reply sound;

(f) checking if or not the subscriber with auto-reservation has given up his call before the set time in said step (d) is over, and asking the main system for cancellation of the interrupt tone;

(g) checking if or not the reservation buffer is full when there is no reservation waiting in said step (b), and thereafter if YES, sending a warning sound, or if NO, saving his and the counter party's information in the reservation buffer, sending a confirmation sound and waiting until the handset is on hook;

(h) checking if or not the subscriber engaged in the telephone conversation has hung up after he heard the interrupt tone in said step (c), and thereafter if YES, turning it into a free state, and if NO, checking if or not the 'hook flash' has been performed;

(i) checking if or not the line is 'busy' when the 'hook flash' is performed in said step (h), and thereafter if YES, providing the subscriber engaged in the telephone conversation with the music and holding the current counter party, then giving said confirmation sound and switching the call buffer into the dialing state; and (j) dialing a call link code depending on the dial state of the call buffer in said step (i), establishing a connection with the subscriber waiting with an auto-reservation to enable a telephone conversation between them.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 3A:
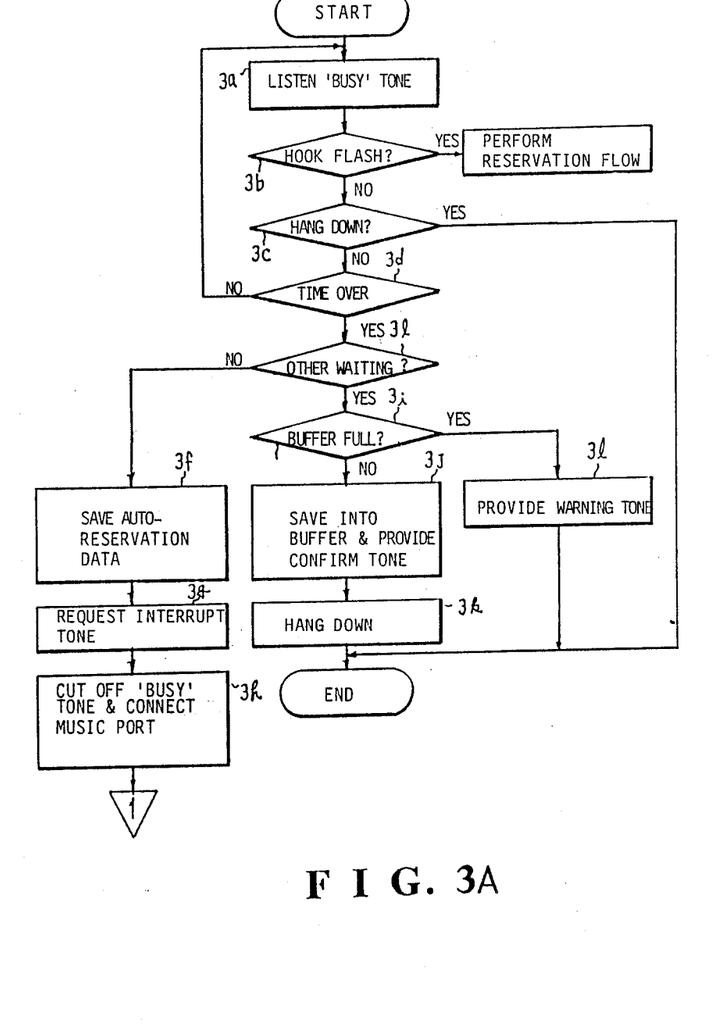
FIG. 3A and 3B are a flow chart that shows how the automatic reservation and transmission of interrupt tone are performed according to the present invention.
Figure 3B:
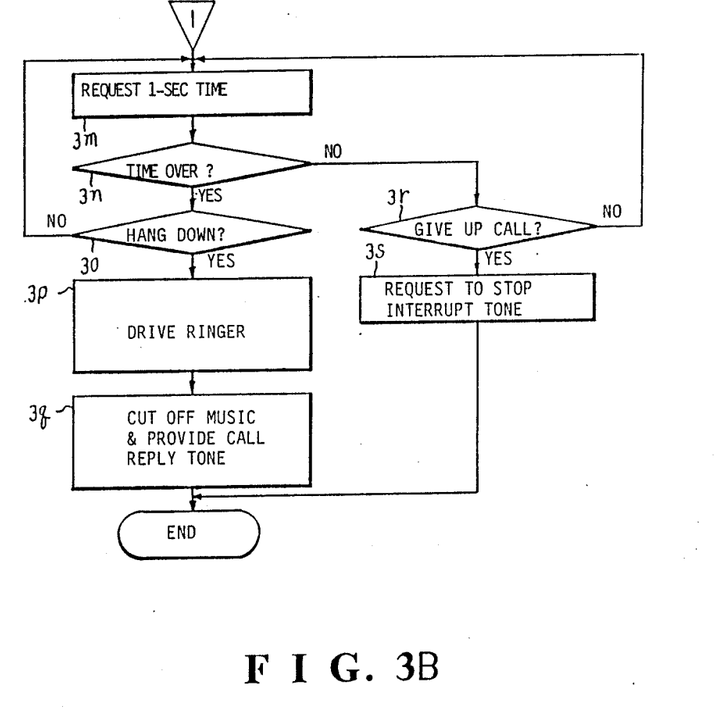

FIG. 3 is a flow chart that shows how the automatic reservation is made and the interrupt tone is given. When the second and third subsets 50, 60 are engaged in telephone conversations or the first subset 40 has dialed the second subset 50 at the time the second and third subsets 50, 60 are talking to each other or the second subset 50 has been simply picked up, the CPU I, which has received dialed signal through the CPU II, gives "busy" tone to the handset of the first subset 40; the CPU I checks if the hook flash was performed in the first subset 40 in the step 3b, checks if the handset is on-hook in the step 3c, and finally checks if the time-over has occured. The steps 3c to 3d are the same as the steps 2a to 2d in the FIG. 2, and when the time-over has occured in the step 3e, the CPU I checks if other subscribers are waiting in the auto-reservation buffer through the transmission/reception units 5, 6 of subset interface circuit.

When there is an auto-reservation waiting, CPU I saves data of those subscribers, who have made auto-reservations with the subscriber engaged in telephone conversation at the second subset 50, in the subscriber's call buffer in the step 3f. After saving the data, the CPU I asks the main system for the interrupt tone in the step 3g. The step 3g is detailed in the FIG. 5.

Figure 5:
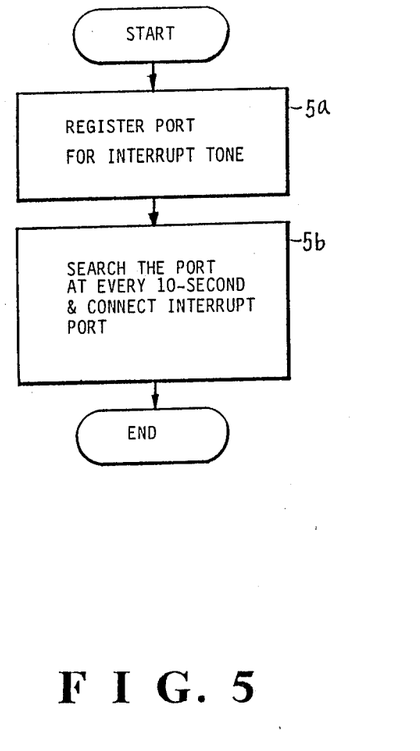
FIG. 5 is a subflow chart of a step 3g in FIGS. 3A and 3B according to the present invention.

The CPU I registers the ports of those subscribers, who should be given the interrupt tones, in the RAM 3 in the step 5a of FIG. 5, checks these ports every 10 seconds, turns off the time switch of the reception part of an appropriate port for a short time, links with port that gives interrupt tones, and then have the appropriate port return to its original state in the step 5b. And in the step 3h the CPU I cuts off the interrupt tones for the reception part and gives musical sounds to the subscriber with an auto-reservation. At that time the first subset 40 and the CPU II requests the CPU I for a time length of one second in the step 3m.

The CPU I checks for one-second time-over in the step 3n, but if the time-over hasn't occured, it checks if the subscriber with an auto-reservation has dropped the call in the step 3r, and if so, the CPU I is asked to cancel the interruption in the step 3s and the step is ended. But if the one-minute time-over has occured in the step 3n, the CPU I is checked in the step 3o to see if the subscriber of the second and third subsets 50, 60, who is having a telephone conversation, has hung up the handset. When the handset is on-hook at the second subset 50 in the step 3, the second subset 50 and the tone ringer 30 are operated to give a ring to the subscriber, who hung up the handset, in the step 3r and the musical sound is stopped and the waiting subscriber receives a reply tone for the call he reserved.

But if there is no other subscriber with an automatic reservation in the step 3e, the reservation buffer in the RAM 3 is checked to see if it is full in the step 3i. If full, a warning sound is given to the handset 29 in the step 3l, and if not, his and the counter part's information is saved in the reservation buffer of RAM 3 and confirmation sound is given to the handset 29 of the first subset 40 in the step 3j and a waiting state is started with the handset on-hook. Process hereinafter follows the conventional reservation service program.

The step described above can be summarized as follows. When a hook flash is performed while listening to the interrupt tone, dialing of the call reservation code can be done according to the conventional method of call reservation flow. The automatic reservation step is started when the time-over of the interrupt tone has occured. And if the time is over, at first the call buffer of the subscriber who is engaged in a telephone conversation, is checked to see if there are any other subscriber waiting with auto-reservation, and if so, the conventional hook flash is performed to thereby register a call reservation code as if it is dialed, then the calling subscriber waits for his turn for reservation service with his handset on-hook. But if there is no other subscriber waiting for automatic reservation in a normal step, it is requested that information of the subscriber with an automatic reservation should be saved in the call buffer of the subscriber engaged in a telephone conversation and that the main system should send interrupt tone. And the subscriber waiting for auto-reservation may switch from sound insertion port to music port using the time switch at the reception unit, then he may wait until the target subscriber hangs up the handset or dialing of call connection code, while enjoying the music. At that time, the subscriber with an automatic reservation asks the main system for call time and in response thereto the main system shall check in every one second if the subscriber engaged in conversation has hung up the handset. And if so, that is, in free state, the one second time will not be asked any more, then the ringer is operated and the target subscriber shall be given a ring. And, for sure, the subscriber with an automatic reservation shall be switched from the music port to call-reply sound port. The rest of the flow is the same as the conventional method of call steping.

The main system, which is asked for interrupt tone, registers ports of appropriate subscribers, and every 10 seconds turns off the time switch of the reception part, links with interrupt tone port, then cut off again to turn on the time switch; this step is repeated until a cancellation request is made. That is, in the FIG. 3, when a subscriber wants to talk to another subscriber engaged in a telephone prior to other subscribers with general call reservation, he is automatically reserved with regular interrupt tones, and the subscriber engaged in a telephone conversation is given the interrupt tones and can talk with said subscriber with a reservation temporarily holding the current conversation with the other subscriber. This can be explained in FIG. 4.

Figure 4:
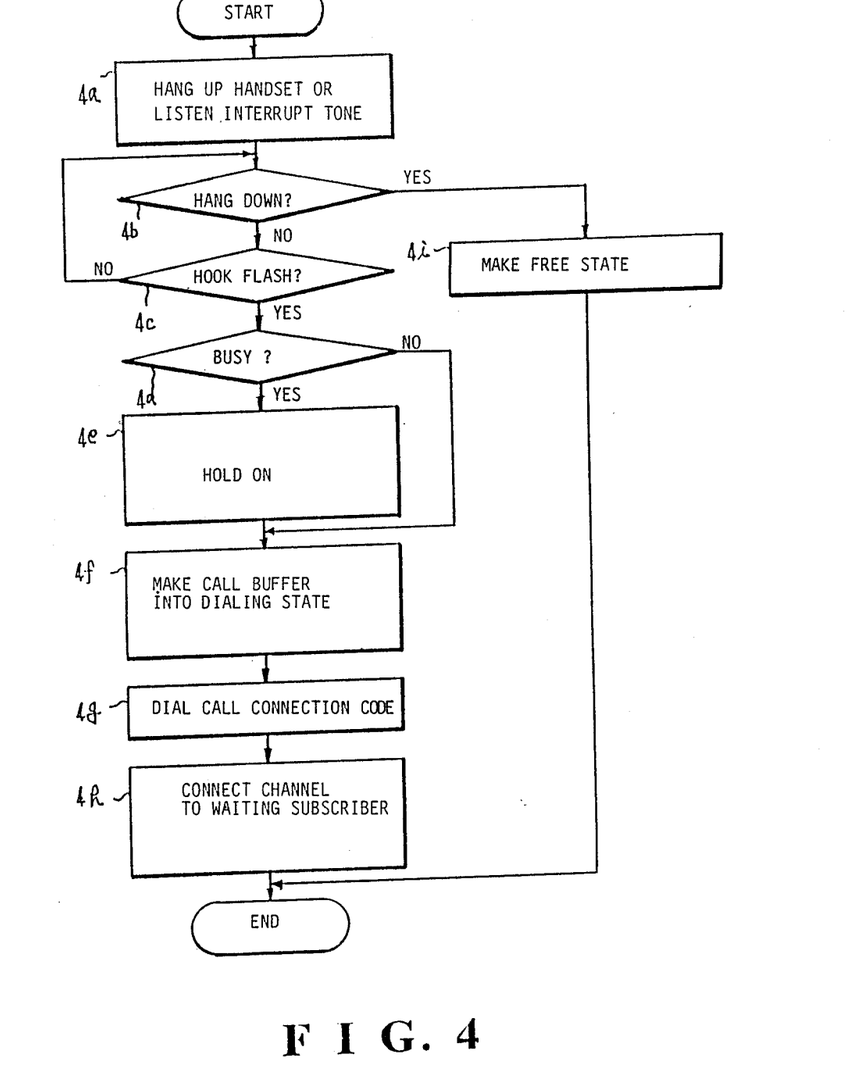
FIG. 4 is a flow chart that shows how a telephone conversation is temporarily held and linked with a subscriber with an auto-reservation according to the present invention.

In the step 4a, the CPU I checks on-hook state of the handset 29 of the first subset 40 and listens to interrupt tones. In this, if the handset is on-hook at the time the CPU I has checked out that the call was completed, it turns each link into free state in the step 4i, and when the handset is not on-hook in the step 4b, the CPU I checks if the first subset 40 had taken hook flash in the step 4c. And when it is checked that the hook flash is performed, in the step 4c, the CPU I checks if the second and third subsets 50, 60 are engaged in telephone conversations. If so, a music is given to one of the subscribers at the second and third subsets 50, 60 who was engaged in telephone conversation and he is controlled to hold the conversation for the time being. Then the CPU I sends a confirmation sound to the handset 29 of the first subset 40, accesses call buffer of the RAM 3 and turns on the dialing state in the step 4f. Then, it controls to dial the call link code in the step 4g and enables conversation with the waiting subscriber with an auto-reservation by establishing a link in the step 4h. It may become clear that, at that time, information on the waiting subscriber with auto-reservation has already been stored in the target subscriber's call buffer.

That is, the FIG. 4 is a flow chart taken from the counter part's point of view, and this subscriber shall hear the interrupt tone in any state other than 'free'. If the subscriber hangs up his handset, he is called up immediately with a ring from the subscriber with an auto-reservation. When the target subscriber is engaged in a telephone conversation, he can hold his current counter party temporarily by performing the hook flash, and then bring the information on the subscriber who has an auto-reservation with him by dialing call link code to establish a connection and talk to the priority subscriber. On the other hand, because the target subscriber would hear the interrupt tone in any state, he can establish a connection with the priority subscriber, by performing the hook flash and dialing the call link code without hanging up the handset, as described above or, for key subset, by simply pressing call connection key even without performing the hook flash.

As described above, according to the conventional method of call reservation a subscriber with an urgent message had to wait for his turn with the handset on-hook after dialing the call reservation code until his target subscriber completes current and all the other calls reserved prior to his reservation. And the target subscriber had no way to know that a subscriber is waiting to have an urgent telephone conversation. But the present invention presents such advantage that call reservation is possible without dialing call reservation code, and provide interrupt tone to inform a target subscriber of urgent messages or call reservation status. Moreover, the target subscriber engaged in a telephone can hear this interrupt tone, and without having to end the conversation with the current counter party, he can hold the conversation temporarily by performing the hook flash and talk to the subscriber with a priority reservation.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claim is:

1. A method of making a call reservation with a subscriber of a subset who is engaged in a telephone conversation in a Private Branch Exchange, making an auto-reservation with the subscriber and sending interrupt tones, said method comprising the steps of:
    (a) listening to 'busy' tone and sequentially deciding if or not 'hook flash' is performed, and thereafter if YES, steping a call reservation, or if NO, checking if or not the handset is on-hook and a specified time period set according to the 'busy' tone is over, when a dialing is made to the subset engaged in the telephone conversation;
    (b) checking if or not there are any other subscribers who are waiting with auto-reservations, when the time-over of the busy tone has occured in the said step (a);
    (c) saving information on the subscriber with auto-reservation in the call buffer of said subscriber engaged in the telephone conversation and asking a main system for the interrupt tones, when there is no waiting for auto-reservation in said step (b);
    (d) switching from the 'busy' tone of reception unit to a music port to provide a music to the subscriber with the auto-reservation and asking the main system for a certain time length and checking the same, following said step (c);
    (e) checking if or not said subscriber engaged in the telephone conversation has hung up his handset, when the time set in said step (d) is over, and thereafter if YES, operating the ringer to send a ring to the subscriber who has hung up the handset and disconnecting the music and providing a call reply sound;
    (f) checking if or not the subscriber with auto-reservation has given up his call before the set time in said step (d) is over, and asking the main system for cancellation of the interrupt tone;

(g) checking if or not the reservation buffer is full when there is no reservation waiting in said step (b), and thereafter if YES, sending a warning sound, or if NO, saving his and the counter party's information in the reservation buffer, sending a confirmation sound and waiting until the handset is on-hook;

(h) checking if or not the subscriber engaged in the telephone conversation has hung up after he heard the interrupt tone in said step (c), and thereafter if YES, turning it into a free state, and if NO, checking if or not the 'hook flash' has been performed;

(i) checking if or not the line is 'busy' when the 'hook flash' is performed in said step (h), and thereafter if YES, providing the subscriber engaged in the telephone conversation with the music and holding the current counter party, then giving said confirmation sound and switching the call buffer into the dialing state; and (j) dialing a call link code depending on the dial state of the call buffer in said step (i), establishing a connection with the subscriber waiting with an auto-reservation to enable a telephone conversation between them.

* * * * *